T. W. HAMMON.

Cultivator-Teeth.

No. 45,671. Patented Dec. 27, 1864.

Witnesses:
C L Topliff
Theo Lusch

Inventor:
T W Hammon
By Munn & Co
Attys

UNITED STATES PATENT OFFICE.

THOMAS W. HAMMON, OF MONTFORT, WISCONSIN, ASSIGNOR TO HIMSELF AND J. H. LINCOLN, OF SAME PLACE.

OPERATING CULTIVATOR-TEETH.

Specification forming part of Letters Patent No. 45,671, dated December 27, 1864.

*To all whom it may concern:*

Be it known that I, THOMAS W. HAMMON, of Montfort, in the county of Grant and State of Wisconsin, have invented a new and useful Improvement in Hanging Cultivator and Grain-Drill Teeth; and I do hereby declare that the following is a full, clear, and exact description thereof, which will enable those skilled in the art to make and use the same, reference being had to the accompanying drawings, forming part of this specification, in which—

Figure 1:
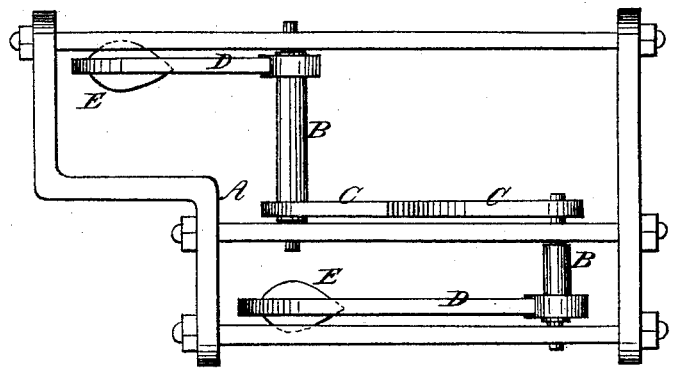
Figure 2:
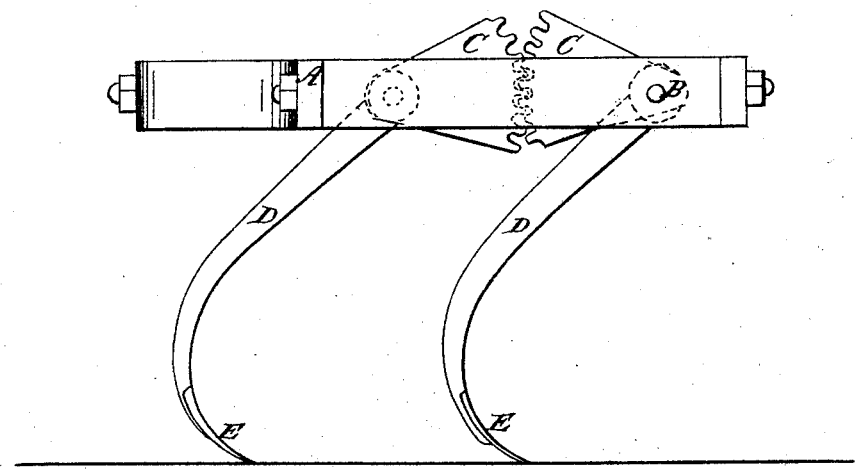

Figure 1 is a plan or top view of teeth hung or arranged according to my invention; Fig. 2, a side view of the same.

Similar letters of reference indicate like parts.

This invention consists in having the standards or arms of the teeth attached to two separate shafts, which are connected by toothed segments, arranged in such a manner that when the teeth of one shaft is raised those of the other shaft will be depressed or lowered, the toothed segments serving as equalizers to insure a proper action of the teeth in the soil, as hereinafter set forth.

A represents a portion of the framing of a cultivator or grain-drill, and B B are two parallel shafts placed therein, and having each a toothed segment, C, keyed on them, said segments gearing into each other, as shown in both figures. On each standard B a standard or arm, D, is firmly attached, having teeth E at their outer ends, which teeth may be of the usual or any proper form.

Any number of standards or arms D may be attached to the shafts B B, and, if desired or necessary, more than two toothed segments C C may be used to form a connection between the two shafts. By this arrangement it will be seen that the teeth of one shaft B are made to equalize those of the other shaft—that is to say, if the teeth of one shaft are forced upward and backward those of the other shaft will be forced down, and vice versa. Hence the teeth will be made to operate in a proper and efficient manner, yielding or giving to obstructions, and being brought back to a working position automatically by the means described, all springs, levers, and similar devices hitherto used for the purpose, and which are comparatively expensive and liable to get out of order, being dispensed with.

I claim as new and desire to secure by Letters Patent—

The employment or use in cultivators and grain-drills of two parallel shafts, B B, connected by toothed segments C C or their equivalents, and having the arms or standards D of the teeth E attached to them, to operate in the manner substantially as and for the purpose herein set forth.

THOMAS W. HAMMON.

Witnesses:
W. O. THOMAS,
THOS. TAYLOR.